Figure 1:
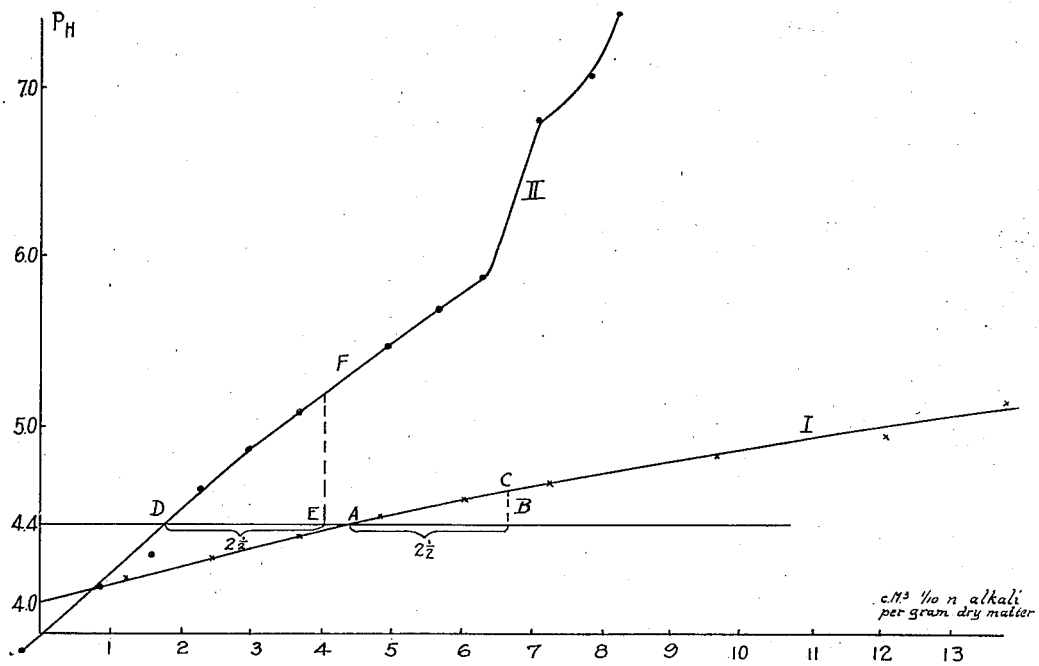

May 17, 1932. F. C. GERRETSEN 1,858,808
BIOLOGICAL PRODUCTION OF BUTYL ALCOHOL AND ACETONE
Filed Oct. 20, 1930

Patented May 17, 1932

1,858,808

UNITED STATES PATENT OFFICE

FREDERIK CHARLES GERRETSEN, OF GRONINGEN, NETHERLANDS

BIOLOGICAL PRODUCTION OF BUTYL ALCOHOL AND ACETONE

Application filed October 20, 1930, Serial No. 490,054, and in the Netherlands April 16, 1928.

I have filed an application for a patent in the Netherlands, on April 16, 1928; and both in Germany and Poland, on April 15, 1929.

As a result of the research work on the possibilities of using the waste pulp of the potato flour factories as material for certain microbiological processes, it was shown that it can be used by different butanol and acetone forming bacteria, provided certain conditions are observed. Though the microbiological manufacturing of butanol and acetone from carbohydrates is a well known process, and carbonates and alkaline substances are frequently used to adjust the pH of the mash to an optimal pH, none of the known formulas gave satisfactory results.

The waste pulp of the potato flour factories differs from all the other raw materials in the fact that it is an evil smelling, generally rotting product, containing variable quantities of organic acids and putrefied proteins. This inconstancy of composition is the reason that none of the known methods could be applied and that a number of special difficulties had to be overcome before the material could be successfully fermented.

The first point to be emphasized is that a simple indication of the pH limits as is given in certain patents is absolutely insufficient in the present case. When observing the usual pH limits, I obtained in a number of cases only a production of butyric acid without even a trace of butanol or acetone being formed. In some other cases only a small quantity of butanol was produced, a considerable percentage of the starch remaining unaltered.

The principal cause of these unsatisfactory results proved to be the fact that not only the initial pH is one of the dominating factors in the process, but that to a considerable extent the buffering capacity of the mash determines the output. The buffering capacity is to be understood as the ratio between the quantity $dx$ of acid or alkali added to a mash and the corresponding change in the pH $dy$. This buffering capacity $$=\frac{dx}{dy}=$$

the co-tangent of the angle between the tangent line at a certain point of the titration curve and the horizontal axis.

Because the usual raw materials for the butanol process have a certain constancy in constitution, this difficulty has not been encountered with these materials; a simple neutralization to a definite pH will secure a maximum yield. In the case of the waste pulp of the potato flour factories, the buffering capacity varies between wide limits as it depends to a large extent on the quantity of organic acids and the degree to which the proteins have been decomposed. In none of the existing patents has this point been sufficiently cleared up, and consequently none of them could be used as a guidance for the fermentation of potato pulp.

In the following method, this point has been carefully worked out with the result that a maximum output can be guaranteed when some other conditions are observed.

A. Acidity and buffering capacity

One of the characteristics of the butanol-acetone fermentation process is that two definite stages succeed each other: first the production of butyric and acetic acid, followed by the reduction of the formed acids to butyl alcohol and acetone. The optimum pH for the latter process lies near pH 4.7, the minimum being 4.4 and the maximum 5.3. When the pH remains above the maximum neither butanol nor acetone is produced; the process stops at the butyric acid formation. During the reduction process the pH comes down a few tenths. The main thing is to regulate the buffering capacity of the mash in such a way that after the main production of the organic acids the pH of the mash falls to 4.7.

This may be obtained by starting from very different pH values in the sterilized mash, as may be explained by the drawings, in which both figures show two titration curves of different kinds of pulp and the manner of calculating approximately the pH value to which the original sterilized mash will have to be neutralized in order to obtain optimal yields of butanol. The original value of the pH is indicated by the ordinate at point 0 of the abscissa.

Curve I in Fig. 1 is a titration curve of a strongly soured pulp, which had been stored up for one year; it is evident that the presence of large quantities of organic acids combined with the fact that the proteins have been rather well preserved causes the pH to rise only very slowly at the addition of alkalies. Curve II in Fig. 1 shows the titration curve of a final waste pulp which had passed the factory for a second time; the free starch has been washed out together with the greater part of soluble proteins and organic acids, with the effect that buffer capacity has been lowered in all parts of the titration curve.

Assuming the optimal pH to be obtained after complete fermentation is 4.4, it is obvious that the initial pH value must be so much above 4.4 as corresponds with the decrease of the pH value caused by the production of acid during fermentation. Therefore, an abscissa is drawn at a pH value of 4.4, intersecting curves I and II respectively at A and D. Assuming that in the fermentation of both pulps the same amount of acid is formed per gram of solid material in the mash, I have to increase the pH value of both mashes above the 4.4 value by adding an amount of alkali corresponding to that amount of acid, which is expressed in the figure, for instance, by an amount $AB=DE$ on the abscissa. The optical initial pH of curve I is the pH corresponding to the point B on the abscissa; that of curve II corresponds with point E on the abscissa. It is clear that the initial $pH$ to which the pulp must be neutralized is much higher in the second case.

This is illustrated by the following experiment: a very acid pulp with an original pH of 3.6 was as such unfermentable. Different quantities of $CaCO_3$ were added, the resulting pH's determined electrometrically and the different outputs after fermentation carefully weighed. Another pulp, which had been stored for a few weeks only, contained a much smaller quantity of organic acids; the original pH of 4.0, however, prevented fermentation just as well. pH's and outputs are summarized in the following table:

Table I

| Acid pulp high buffering capacity | | | | | | New pulp low buffering capacity | | | | |
|---|---|---|---|---|---|---|---|---|---|---|
| Gr. $CaCO_3$ added to 1000 gr. pulp (calc. on dry matter) | 0 | 12.3 | 24.5 | 36.5 | 49.0 | 0. | 10.9 | 22.5 | 32.7 | |
| Resulting pH | 3.6 | 4.4 | 4.7 | 5.2 | 6.0 | 4.0 | 6.0 | 6.4 | 6.5 | |
| Output in per cent of the maximum quantity produced | 0 | 98 | 100 | 93 | 69 | 0. | 91 | 100.0 | 0. | |

The first pulp gave a maximum output at an initial pH of 4.7, whereas at the usual pH of 5.2 it gave only 93% of the maximum yield. The second pulp with low buffering capacity gives a maximum output at an initial pH of 6.4, notwithstanding this is 1.2 higher than the usual pH of 5.2. Increasing the pH only one tenth from 6.4 to 6.5, however, suddenly stops all butanol and acetone formation; in this case the optimal pH could not be reached because of the presence of a small excess of calcium carbonate, and only butyric acid could be formed.

One notices that the limits for adding $CaCO_3$ are much wider in the case of the highly buffered material than in that with the lower buffering capacity. Moreover, it is evident that it is impossible to state a general set of fixed pH limits which will guarantee a maximum output; these limits have to be determined for each pulp individually according to the buffering capacity and the other properties of the mash.

As a rule it has to be observed that the initial pH is not above 6.4 or below 4.4, whereas the buffer capacity has to be adjusted in such a way that after the main acid production has ceased the mash has reached a pH of 4.7 approximately.

B. Sterilization of the mash

After the addition of lime or other alkaline substances the mash has to be mixed thoroughly and has to be sterilized for at least half an hour at one-half atmosphere pressure. This differs from the corn mash, which is to be sterilized at much higher pressure and for a considerable longer period. Experiments showed that a potato pulp mash sterilized for half an hour at ½ atmosphere yielded after fermentation 85% of the maximum output; at 1 atmosphere 100% was formed, at 1½ atmospheres 94.9%, and at 2 atmospheres only 87%.

In the case of very concentrated mashes, the hydrolyzing action of the organic acids originally present in the mash might be used to liquefy the starch to a certain extent; to this end the mash is heated a short time under pressure before alkaline substances are added.

C. Concentration of the mash

One of the other difficulties to be met is the rather low concentration of butanol and acetone in the fermented mash. It is inadvisable to increase the pulp content of the mash above 4–5% dry material, because of the thickness of the mash which retards fermentation.

The preferred method is to incubate the mash twenty-four hours after inoculation with the butyl-acetone bacteria and add another quantity of sterile mash at the moment that the hydrolyzation of the starch in the original mash has been completed. It is desirable to add a quantity of the muddy sludge starch, which deposits from the washing water of the potato flour factories and which is also more or less a waste product. Care should be taken that the total amount of fermentable carbohydrates does not exceed 7.5%. This has the advantage that the percentage of butanol and acetone in the fermented mash is much higher, whereas the fermentation generally is accelerated and the yields are higher.

Approximately 32% of the starch present in the pulp is converted into solvents; by adding sludge starch to the mash this is sometimes increased to 42%. It is also possible to add small quantities of pure starch or molasses, depending on the nitrogen content of the pulp and the sludge starch.

D. Inoculation of the mash

The mash is inoculated with active bacteria belonging to the Bacillus amylobacter (Bredemann) group isolated in the usual way from the soil or from cereals. Starting with the spores of the bacteria, which have been heated for 45 seconds at 100° C. to get rid of the weak inactive individuals, a small quantity of mash is inoculated.

After twenty-four hours the next transfer is made into a quantity of mash which is 20-50 times as large as that used in the former fermentation. This procedure of making transfers within twenty-four hours into augmenting quantities of mash is repeated until sufficient fermenting mash is produced to inoculate the main fermentation. Care has to be taken that in general not more than six or seven transfers are made to reach this point in order to avoid a weakening of the bacteria.

The main fermentation is generally finished within 3 times 24 hours after inoculation and incubation at 37.5 C.

Details of the method

To determine the buffering capacity of a mash a number of flasks are provided with 25 grams (wet) pulp, of which dry material and starch content are carefully determined. Increasing quantities of 1/10th normal sodium hydroxide are added, and after sterilization at 1 atmosphere the pH is determined. The results calculated as cc. $\frac{1}{10}$ n alkali on 1 gram dry material are presented graphically.

To calculate the quantity of lime or other alkaline substances necessary for optimal fermentation conditions, it is supposed that with a pH 4.7 for optimal butanol forming, the final pH will approximately be 4.4, which is usually the case.

Experiments with waste potato pulp of different origin and acidity have shown that in general the best results are obtained when down to this final pH point approximately 2½ cc. $\frac{1}{10}$ n acid can be buffered per gram of dry matter.

Figure 2:
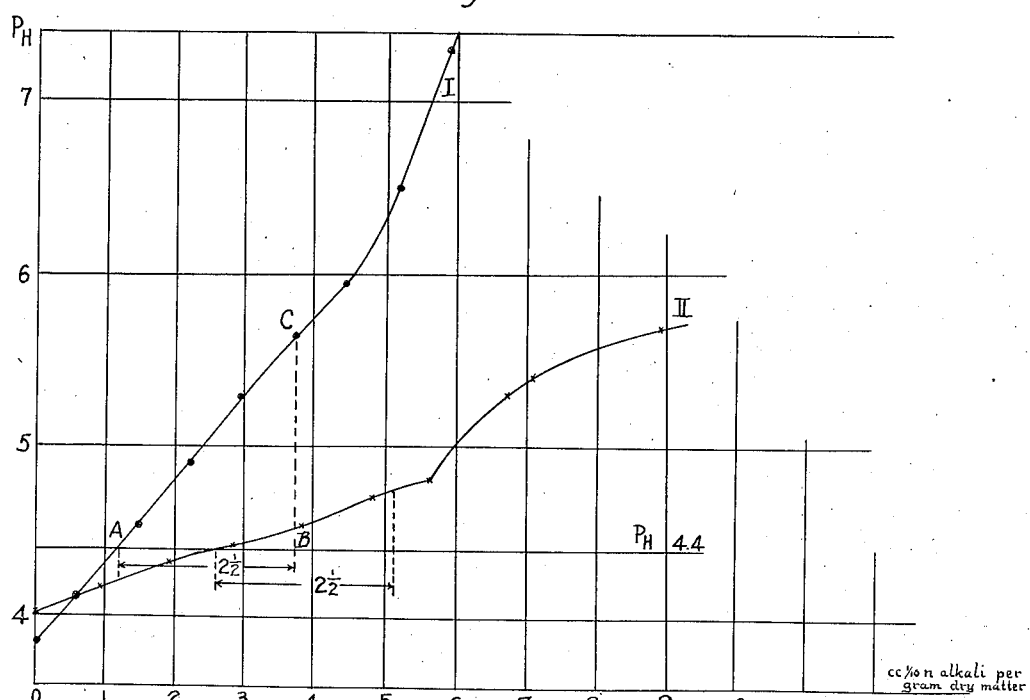

In Fig. 2, curve I refers to a pulp of low buffering capacity. From the point A of intersection of this curve with the pH 4.4 line I add 2½ cc. of 1/10 n alkali per gram of dry matter and erect a perpendicular BC. The point of intersection C of this line with the titration curve indicates the pH (in the figure, 5.66) to which this pulp approximately has to be neutralized; the amount of alkali to be added can be read from the diagram. It is emphasized that the calculation of the amount of alkali to be used to neutralize the mash is based on the amount of dry material in the mash.

As the neutralizing capacity of different alkaline substances differs somewhat with their chemical nature, it is advisable to control the found value by at least three provisional fermentations, one with the theoretical amount, one with less, and one with more alkali.

Example 1

Material: A new pulp slightly acid; dry matter content 14.9%; starch content in the dry matter 62%; initial pH 3.86.

10 flasks containing 25 grams pulp in 100 cc. water receive respectively 0; 3; 6; 9; 12; 15; 18; 21 and 24 cc. $\frac{1}{10}$ n NaOH. Resulting pH's determined after sterilization are plotted against added NaOH per gram dry material. (Curve I, Fig. 2).

When $CaCO_3$ is used in the practical application of the process, the quantity necessary to reach the optimal pH differs in most cases somewhat from the equivalent of the quantity of NaOH required for the same, as has been pointed out before. In this special case, it was found that the addition of 100 m. gr. $CaCO_3$ to 25 gr. of wet pulp was required to increase the pH from 3.86 to 5.7. For the provisional fermentations different quantities of $CaCO_3$ are added to 750 gr. pulp (wet) suspended in 3 litres of water; the mash is sterilized, pH's determined, and after fermentation the yields are noted.

Table II

| | Gr. $CaCO_3$ | Result. pH | Output in gram butanol acetone mixt. | Output in per cent of the max. quantity |
|---|---|---|---|---|
| No. 1 | 0 | 3.9 | 0 | 0 |
| 2 | 1 | 4.5 | 22.8 | 91.7 |
| 3 | 2 | 5.5 | 24.3 | 97.0 |
| 4 | 3 | 5.7 | 25.0 | 100.0 |
| 5 | 4.5 | 6.1 | 19.8 | 69.4 |

It is evident that the quantity of $CaCO_3$ calculated to adjust the initial pH to 5.7 gave the right buffering capacity, as is shown by No. 4 in the table.

The maximum output amounts to 34% of the starch content of the pulp.

Example 2

Material as above; moreover, soured sludge starch directly from the factory settling tanks; dry material content 14.6%.

To 1250 gr. wet pulp suspended in 5 liters of water, 5 gr. $CaCO_3$ are added, corresponding to experiment No. 4 in Table II. As soon as the mash fermented vigorously, 1500 gr. sterilized undiluted sludge starch was added. The quantity of alkaline substances required to neutralize the sludge starch is found by the same procedure as already described for the pulp and has to be substantially equivalent to two and one half of decinormal sodium hydroxide per gram of dry matter in the sludge, plus or minus the quantity necessary to produce a pH of 4.4 in the original sterilized sludge.

In the present case 1500 grams of the original sludge starch required 35 cc. normal NaOH to be suitably neutralized. The undiluted material is heated for some time to hydrolize the starch by the acids already present in the sludge, the alkaline substances are added and after being sterilized are mixed with the original fermenting mash.

The output was 118.8 grams butanol-acetone mixture or 36.4% of the total starch content.

The object in adding sludge starch was to increase the concentration of the solvents in the fermented mash, which succeeded rather well, the concentration being 1.5%, which is considerably higher than with pulp alone.

Example 3

Material: acid pulp, more than one year old; dry matter content 15.2%; initial pH 4.0.

To ten flasks containing 25 gr. pulp each, increasing quantities of $\frac{1}{10}$ n NaOH are added. These quantities are plotted against the resulting pH's in curve II, Fig. 2.

In the above-mentioned way it was found that the optimal initial acidity lies at pH 4.75. To obtain this acidity, 5.1 cc. 1/10 n NaOH per gram dry material is needed.

The same acidity is found to be obtained by adding 4.7 gr. $CaCO_3$ on 1800 gr. wet pulp. The mash is made up by adding 9 liters of water. Resulting pH's and the yields after fermentation are to be found in Table III.

Table III

| | Gr. $CaCO_3$ | Result. pH | Output in gr. solvent mixture | Output in per cent of the maximum quantity |
|---|---|---|---|---|
| No. 1 | 0 | 4.0 | 0 | 0 |
| 2 | 2.5 | 4.3 | 0 | 0 |
| 3 | 4.7 | 4.7 | 71.0 | 100 |
| 4 | 9.8 | 5.5 | 65.5 | 87.5 |
| 5 | 18.9 | 6.4 | 33.7 | 44.7 |

Also in this case it is evident that the calculated quantity of $CaCO_3$ in No. 3 gives a maximum output while compared with Example 1, one notices that maximum yields can be obtained at quite different pH's, while the right buffer capacity has to be observed for each mash individually.

The output in case No. 3 amounts to 43.8% of the total starch content, which is exceptionally high. This is probably due to the fact that part of the organic acids are also fermented.

Résumé

Herein for the first time a process for the manufacture of butyl alcohol and acetone has been worked out which uses as a raw material the cheap waste pulp of the potato flour factories. This material differs from all other materials used previously for this process by its inconstant constitution and unstable properties. In consequence of this inconstancy, none of the existing methods could be used, whereas the described method guarantees a maximum output in widely divergent cases.

What I claim is:—

1. The process of manufacturing butyl alcohol and acetone from a mash of waste pulp of potato flour factories, comprising the step of adding an alkaline substance to the mash substantially equivalent to two and one half cubic centimeters of decinormal sodium hydroxide for every gram of dry material in the mash, plus the quantity necessary to produce a pH of approximately 4.4 in the original sterilized mash.

2. The process of manufacturing butyl alcohol and acetone from a mash of waste pulp of potato flour factories, comprising the step of adding lime to the mash substantially equivalent to two and one half cubic centimeters of decinormal sodium hydroxide for every gram of dry material in the mash plus the quantity necessary to produce a pH of approximately 4.4 in the original sterilized mash.

3. The process of manufacturing butyl alcohol and acetone from a mash of waste pulp of potato flour factories, comprising the step of adding carbonate of lime to the mash substantially equivalent to two and one half cubic centimeters decinormal sodium hydroxide for every gram of dry material in the mash, plus the quantity necessary to produce a pH of 4.4 in the original sterilized mash, sterilizing the mash and subjecting it to a fermentation with suitable bacteria.

4. The process of manufacturing butyl alcohol and acetone, comprising the steps of adding an alkaline substance to a mash of waste pulp of potato flour factories, substantially equivalent to two and a half cubic centimeters of decinormal sodium hydroxide for every gram of dry material in the mash, plus the quantity necessary to produce a pH of 4.4 in the original sterilized mash, sterilizing the mash, subjecting it to a fermentation with suitable bacteria, adding a sterilized mash of the same kind containing more than 4% dry matter, and continuing the fermentation.

5. The process of manufacturing butyl alcohol and acetone, comprising the steps of adding an alkaline substance to a mash of waste pulp of potato flour factories, substantially equivalent to two and a half cubic centimeters of decinormal sodium hydroxide for every gram of dry material in the mash, plus the quantity necessary to produce a pH of 4.4 in the original sterilized mash, sterilizing the mash, subjecting it to a fermentation with suitable bacteria, adding a sterilized mash which contains the starch product of the settling tanks of potato flour factories, and continuing the fermentation.

6. The process of manufacturing butyl alcohol and acetone, comprising the steps of adding an alkaline substance to a mash of waste pulp of potato flour factories, substantially equivalent to two and a half cubic centimeters of decinormal sodium hydroxide for every gram of dry material in the mash, plus the quantity necessary to produce a pH of 4.4 in the original sterilized mash, sterilizing the mash, subjecting it to a fermentation with suitable bacteria, adding a sterilized mash containing more than 4% carbohydrates, and continuing the fermentation.

In testimony whereof, I affix my signature.
FREDERIK CHARLES GERRETSEN.